United States Patent

Hashimura et al.

[11] Patent Number: 5,978,149
[45] Date of Patent: Nov. 2, 1999

[54] ZOOM LENS SYSTEM

[75] Inventors: Junji Hashimura, Sakai; Hiromu Mukai, Kawachinagano; Hideki Nagata, Sakai, all of Japan

[73] Assignee: Minolta Co., Ltd., Osaka, Japan

[21] Appl. No.: 08/946,155

[22] Filed: Oct. 7, 1997

Related U.S. Application Data

[63] Continuation of application No. 08/489,594, Jun. 12, 1995, abandoned.

[30] Foreign Application Priority Data

Jun. 15, 1994 [JP] Japan .................................. 6-132882

[51] Int. Cl.$^6$ .................................................. G02B 15/14
[52] U.S. Cl. ........................................... 359/676; 359/677
[58] Field of Search ..................................... 359/676, 677, 359/683

[56] References Cited

U.S. PATENT DOCUMENTS

| | | | |
|---|---|---|---|
| 3,051,052 | 8/1962 | Bergstein | 359/677 |
| 3,294,471 | 12/1966 | Back | 359/677 |
| 3,454,321 | 7/1969 | Klein | 359/677 |
| 4,232,942 | 11/1980 | Ikemori | 359/677 |
| 4,624,536 | 11/1986 | Nakagawa | 359/677 |
| 4,842,385 | 6/1989 | Tanaka | 359/684 |

FOREIGN PATENT DOCUMENTS 57-6814  1/1982  Japan .

*Primary Examiner*—Scott J. Sugarman
*Attorney, Agent, or Firm*—Price Gess & Ubell

[57] ABSTRACT

A zoom lens system includes two lens components, and zooming is performed by moving a first lens component. The zooming is performed along a zoom curve such that the first lens component is moved out so that in-focus condition is obtained at a subject distance predetermined with respect to each focal length. As the subject distance, an excess focal length or a subject distance where the far side of the depth of field is the maximum flash reachable distance or a subject distance where the near side of the depth of field is the shortest object distance or a subject distance where the object distance or the magnification is fixed is set according to the purpose.

18 Claims, 2 Drawing Sheets

ZOOM LENS SYSTEM

This is a continuation of prior application Ser. No. 08/489,594, filed on Jun. 12, 1995, now abandoned.

BACKGROUND OF THE INVENTION

1. Field of the Invention

The present invention relates to a zoom lens system, and more specifically, to a zoom lens system not requiring any focusing operation and employable for a lens-fitted photographic film package.

2. Description of the Prior Art

Conventionally, an inexpensive camera such as a lens-fitted photographic film package and a lens shutter camera uses a uni focal optical system (e.g. a uni focal lens consisting of one plastic lens) or a bi focal optical system. These optical systems employ a focusing method such as a fixed focus method and a zone focusing method having many advantages. For example, the fixed focus method is a method to enable photographing of a wide range from infinity ($\infty$) to a close subject by fixing the subject distance to an excess focal length. This method is particularly superior in operability and cost since focusing in normal photography and a mechanism therefor are unnecessary.

On the other hand, it is desired to use a zoom lens system as the optical system of an inexpensive camera such as the lens-fitted photographic film package. However, since the excess focal length differs depending on the focal length, the above-mentioned fixed focus method cannot be employed for focusing of the zoom lens system. In addition, the normal focusing method as employed for a single-lens reflex camera cannot be employed since it is disadvantage in operability and cost. For this reason, no film package having a zoom lens system has ever been manufactured although the use of the zoom lens system is greatly desired.

Japanese Laid-open Patent Application No. S57-6814 proposes a lens barrel where the excess focal length is applied to focusing of a zoom lens system. In the zoom lens barrel, focusing is performed by a rotation of a distance ring about the optical axis, and during zooming, the distance ring moves straight relative to a fixed barrel along the optical system. Excess focal length graduations which are continuous in correspondence with the focal length during zooming are provided on the periphery of the fixed barrel, and an index which is set at an excess focal length graduation to perform a simple focusing is provided on the distance ring.

However, to set the subject distance at the excess focal length in the zoom lens barrel of Japanese Laid-open Patent Application No. S57-6814, it is necessary for the user to set the index at an excess focal length graduation. Further, this lens barrel is disadvantageous in cost since it is necessarily structured on the premise that a focusing operation is performed. Therefore, this zoom lens barrel cannot be employed for an inexpensive camera such as the lens-fitted photographic film package.

Presently, lens-fitted photographic film packages for various purposes are on the market. For example, in view of purposes such as flash photography, close photography and fixed magnification photography, even though the above-mentioned fixed focus method can be employed for the film having a zoom lens system, the best image cannot always be obtained. The reason therefor will be described below.

According to the fixed focus method, focusing in the normal photographing is unnecessary as described above. However, it is only with respect to a subject at the excess focal length that the best image in the best focus condition is obtained. Nevertheless, in most cases, the subject which the user wishes to photograph the most is not located at the excess focal length, and according to the purpose, the subject is largely away from the position of the excess focal length. Then, the photography possible distance is merely increased haphazardly. In addition, the photography possible distance naturally has its limitation. For example, when a subject the photographer wishes to photograph the most is located closer to the optical system than to the front depth of field, focusing is impossible.

Therefore, when the fixed focus method is employed as a focusing method for a specific purpose, the best image cannot always be obtained according to the focusing of the conventional fixed focus method setting the excess focal length as the subject distance. No solution has ever been proposed to this problem.

SUMMARY OF THE INVENTION

An object of the present invention is to provide a zoom lens system being of low cost, excellent in operability and not requiring any focusing operation.

Another object of the present invention is to provide a zoom lens system being of low cost, excellent in operability, not requiring any focusing operation and capable of photographing suitable for specific purposes in excellent focus condition.

To achieve the above-mentioned objects, a zoom lens system of the present invention includes a plurality of lens components, and zooming is performed by moving a predetermined lens component according to a zoom curve which is set so that an in-focus condition is obtained at a predetermined subject distance according to a focal length.

With such features, since the lens component is moved out so that an in-focus condition is obtained at a predetermined subject distance with respect to each focal length in zooming, the focus deviation due to the variation in focal length does not occur. In addition, since a photography possible distance range suitable for a purpose can be assumed, when the subject distance is set at the excess focal length, a subject the user wishes to photograph is more excellently focused on.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 2:
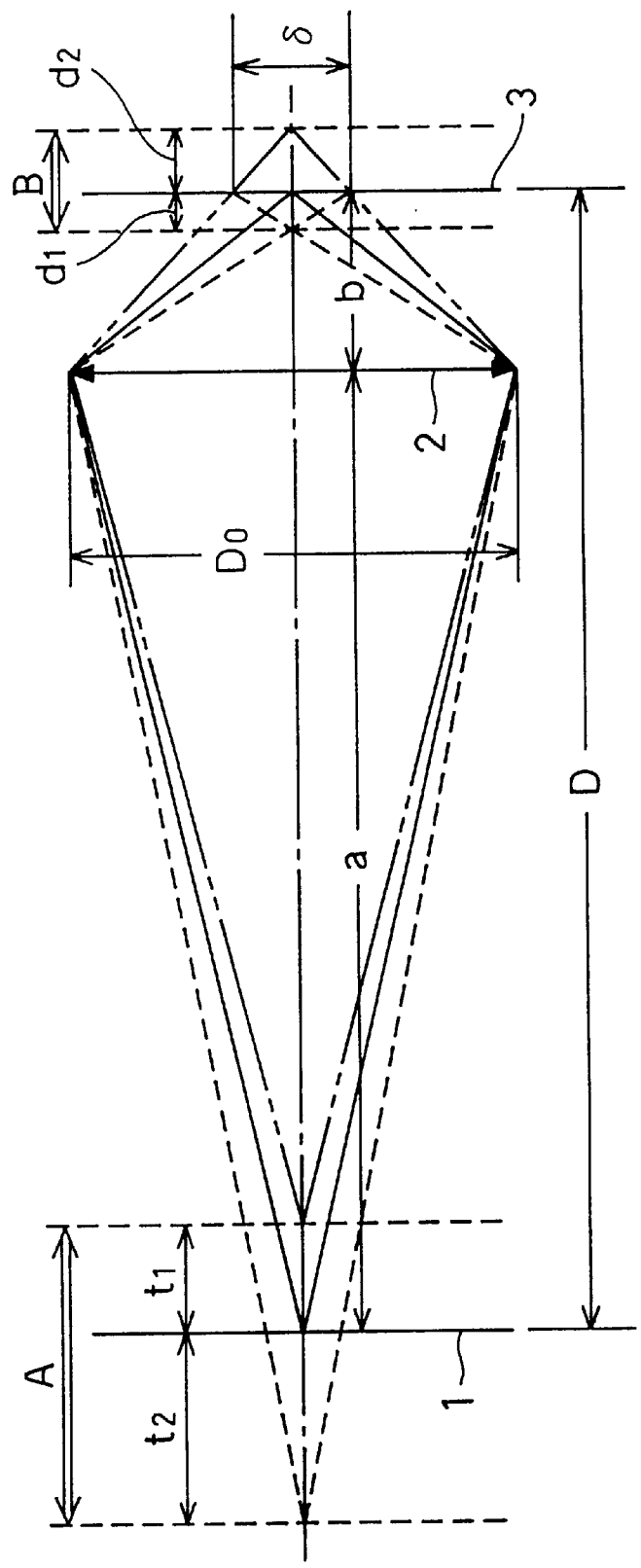
FIG. 2 is a view of assistance in explaining a relationship between the subject distance and a depth of field in the embodiment of the present invention.

Hereinafter, a zoom lens system according to an embodiment of the present invention will be described with reference to the drawings. First, a depth of field A for obtaining a zoom curve used in this embodiment will be described with reference to FIG. 2. In FIG. 2, reference numeral 1 represents a subject. Reference numeral 2 represents a zoom lens system. Reference numeral 3 represents an image plane (film plane). D represents an object distance. a represents a subject distance. b represents an image distance. δ represents the diameter of permissible circle of confusion (i.e. permissible blur amount). A represents the depth of field. $t_1$ represents a front (near side) depth of field. $t_2$ represents a rear (far side) depth of field. B represents a depth of focus. $d_1$ represents a depth of focus on the under side of the image plane. $d_2$ represents a depth of focus on the over side of the image plane. $D_0$ represents an effective aperture.

With respect to the zoom lens system 2, when f represents a focal length and F represents an F-number, the following image formation formula holds:

$$\frac{1}{a} + \frac{1}{b} = \frac{1}{f} \quad (1)$$

where a>0.

Further, when the formula (1) is applied with the front limit of the front depth of field $t_1$ as the object point, the following expression (2) holds and when the formula (1) is applied with the rear limit of the rear depth of field $t_2$ as the object point, the following expression (3) holds:

$$\frac{1}{a-t_1} + \frac{1}{b+d_2} = \frac{1}{f} \quad (2)$$

$$\frac{1}{a+t_2} + \frac{1}{b-d_1} = \frac{1}{f} \quad (3)$$

On the other hand, from geometrical correlation constituted by an optical path behind the zoom lens system 2, the following expressions (4) and (5) hold:

$$\frac{d_2}{b+d_2} = \frac{\delta}{D_0} \quad (4)$$

$$\frac{d_1}{b-d_1} = \frac{\delta}{D_0} \quad (5)$$

The expressions (1) to (5) are rewritten as shown below, wherein $D_0$ of the expressions (4) and (5) is represented by f and F with a definition $F \equiv f/D_0$:

$$b = \frac{af}{a-f} \quad (1')$$

$$t_1 = \frac{-(b+d_2)f}{b+d_2-f} + a \quad (2')$$

$$t_2 = \frac{(b-d_1)f}{b-d_1-f} - a \quad (3')$$

$$d_2 = \frac{\delta b}{D_0 - \delta} = \frac{\delta a f}{\left(\frac{f}{F} - \delta\right)(a-f)} \quad (4')$$

$$d_1 = \frac{\delta b}{\delta + D_0} = \frac{\delta a f}{\left(\delta + \frac{f}{F}\right)(a-f)} \quad (5')$$

By substituting the expressions (1'), (4') and (5') in the expressions (2') and (3') representing the front and rear depths of field $t_1$ and $t_2$, the following expressions (6) and (7) are obtained:

$$t_1 = \frac{a\delta F(a-f)}{f^2 + (a-f)\delta F} \quad (6)$$

$$t_2 = \frac{a\delta F(a-f)}{f^2 - (a-f)\delta F} \quad (7)$$

Since a>>f, (a–f) of the expressions (6) and (7) can approximate a. Therefore, the front depth of field $t_1$ and the rear depth of field $t_2$ are represented by the following expressions (8) and (9):

$$t_1 = \frac{\delta F a^2}{f^2 + \delta F a} \quad (8)$$

$$t_2 = \frac{\delta F a^2}{f_2 - \delta F a} \quad (9)$$

As is apparent from the expressions (8) and (9), the front depth of field $t_1$ and the rear depth of field $t_2$ depend on the diameter of permissible circle of confusion δ, the F number, the focal length f and the subject distance a. The subject 1 located within the depth of field A (=$t_1+t_2$) is imaged within the depth of focus B (=$d_1+d_2$) to be substantially in focus. Therefore, by shifting backward and forward the field of depth A which is set as the photography possible distance range according to the focal length f by setting a condition such that the subject distance a depends on the focal length f, focusing can be performed in accordance with the purpose even if the focal length varies during zooming.

In this embodiment, in a zoom lens system including two lens components and where zooming is performed by moving the first and second lens components, zooming is performed along a zoom curve such that the first lens component is moved out so that an in-focus condition is obtained at a predetermined subject distance a (or object distance D) with respect to each focal length f. This arrangement is employed not only in the two component zoom lens system but also in a zoom lens system having three or more lens components. Depending on the optical arrangement, zooming may be performed along a zoom curve such that not only the first component but all or a part of the components moved for zooming are moved out.

Figure 1:
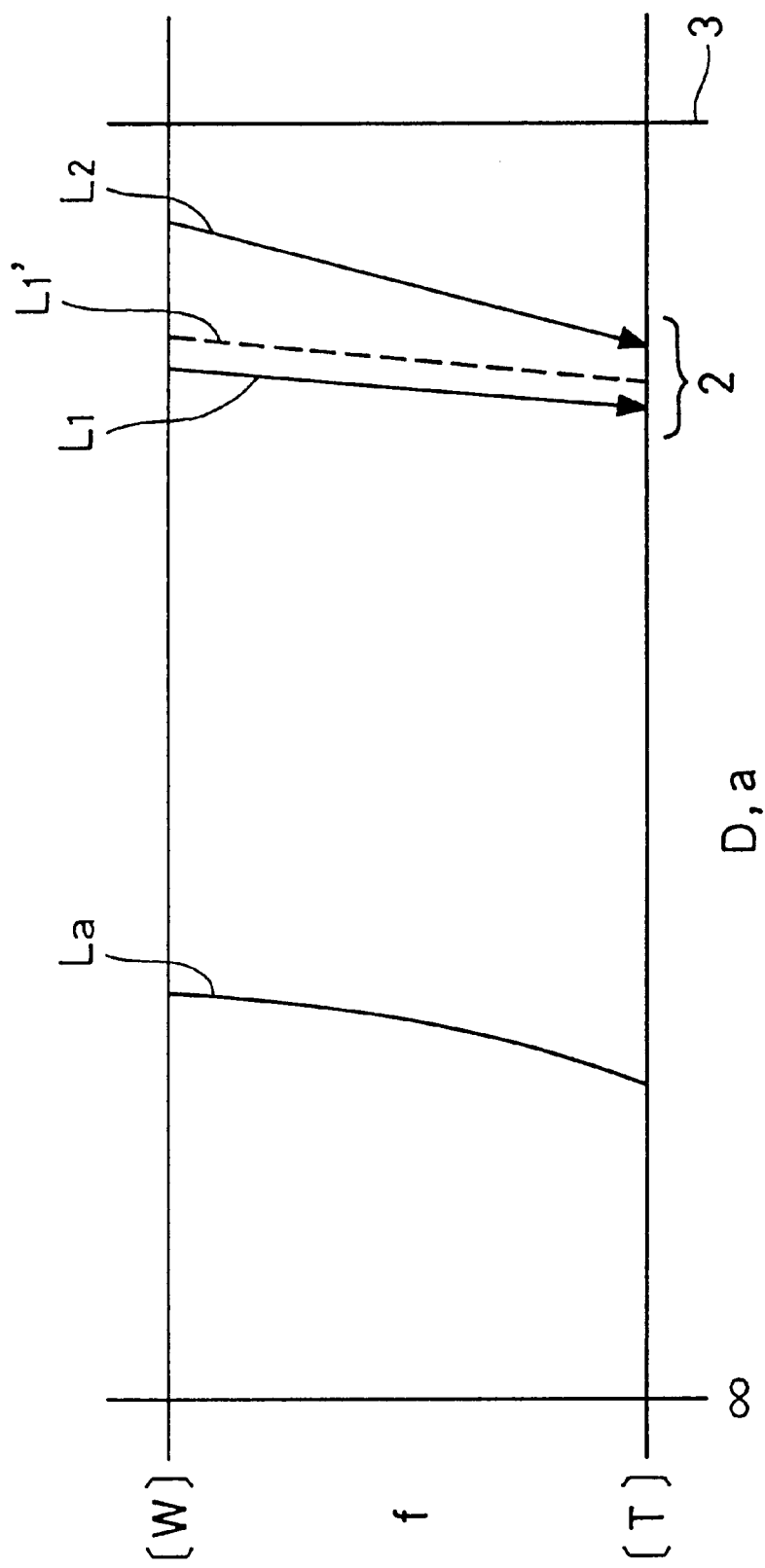
FIG. 1 shows a relationship between a focal length and a subject distance, and zoom curves in an embodiment of the present invention.

Referring to FIG. 1, there is shown a relationship between the focal length f and the subject distance a in this embodiment. A curve $L_a$ of the subject distance a represents a predetermined subject distance a with respect to each focal length f. The curve $L_a$ is decided according to a specific purpose as described later. Zoom curves $L_1$ and $L_2$ represent movements of the first and second components from the wide angle limit (W) to the telephoto limit (T), respectively. The first lens component is moved out so that an in-focus condition is obtained at the subject distance a.

In a conventional zoom lens system, typically, the movement of the first lens component for zooming is made along a zoom curve $L_1'$ (broken line) designed so that D=∞, and focusing is performed by moving out all or a part of the first lens component. On the contrary, in this embodiment, the subject distance a at each focal length f is decided by the curve $L_a$, and zooming is performed along the zoom curve $L_1$ with the first lens component being moved out so that a subject 1 at a target subject distance a is located on the image plane 3 according to each focal length f even if the focal length f varies. Therefore, an operation for focusing and a mechanism therefor is unnecessary. Thus, this embodiment which is excellent in operability and can be realized at a low cost is suitable for inexpensive cameras such as lens-fitted photographic film packages.

Subsequently, the subject distance a will be described with normal photography, flash photography, close photography and fixed magnification photography as examples of the above-mentioned specific purposes. Since the object distance D depends on the subject distance a and the focal length f (D=a+b), the object distance D is equivalent to the subject distance a with respect to the set zoom curve $L_1$.

Normal Photography

In normal photography, like the conventional fixed method, the occurrence of extreme out-of-focus condition is prevented by increasing the photography possible distance range. For example, photographing of a wide object distance range such as a subject including its background is included in this photography. In normal photography, zooming is performed so that in-focus condition is obtained at the excess focal length (i.e. the excess focal length is set as the subject distance a) with respect to each focal length f.

The subject distance a is obtained in the following manner: The excess focal length is a subject distance a where the rear depth of field $t_2$ is infinity ($t_2=\infty$). Therefore, by applying $t_2=\infty$ to the above-described expression (9), the following expression (A) is obtained. The expression (A') is obtained from the expression (1').

$$a = \frac{f^2}{\delta F} \quad (A)$$

$$D = a + b \quad (A')$$

$$= \frac{f^2}{\delta F(f - \delta F)}$$

If $\delta$ and F are fixed in the expression (A), the subject distance a depends on the focal length f, so that the depth of field A which is set as the photography possible range can be shifted backward and forward according to the focal length f. Therefore, by performing zooming with the first lens component being moved out so that the subject 1 located at the subject distance a represented by the expression (A) (or at the object distance D represented by the expression (A')) is imaged on the image plane 3, a depth of field A where the front depth of field $t_1$ is a/2 and the rear depth of field $t_2$ is infinity can be set as the photography possible distance range.

Flash Photography

When the maximum reachable distance of the flash is S, in flash photography, zooming is performed so that in-focus condition is obtained at a subject distance a where the far side (i.e. rear side) of the depth of field A is the maximum flash reachable distance S with respect to each focal length f.

The subject distance a is obtained in the following manner: When the flash and the film plane (image plane) 3 are located substantially at the same position and the guide number of the flash is G, the flash reachable distance S is represented by the following expression (10). The object distance D is represented by the following expression (11).

$$S = \frac{G}{F} \quad (10)$$

$$D = a + b \quad (11)$$

When the rear limit of the rear depth of field $t_2$ is set as the far side of the depth of field A, the flash light reaches the subject 1 while surely covering the depth of field A. Therefore, when a distance obtained by adding the rear depth of field $t_2$ to the object distance D is set as the maximum flash reachable distance S, the following expression (12) is obtained from the expression (11):

$$S = D + t_2 \quad (12)$$

$$= a + b + t_2$$

By substituting the above-described expressions (1') and (9) in an expression (13) obtained from the expressions (10) and (12), the following expression (B) is obtained:

$$\frac{G}{F} = a + b + t_2 \quad (13)$$

$$= a + \frac{af}{a-f} + \frac{\delta F a^2}{f^2 - \delta F a} \quad (B)$$

If $\delta$, F and G are fixed in the expression (B), the subject distance a depends on the focal length f, so that the depth of field A which is set as the photography possible range can be shifted backward and forward according to the focal length f. Therefore, by performing zooming with the first lens component being moved out so that the subject 1 located at a subject distance a obtained from the expression (B) is imaged on the image plane 3, the close photography possible range is close to the camera to remove an excess photography possible distance. As a result, the photography possible range is from the flash reachable distance S to the close photography area.

Close Photography

The close photography area frequently differs according to the focal length f (e.g. a zoom lens system where in-focus condition is obtained at the excess focal length). For this reason, inconveniently, every time photographing is performed, it is necessary to set the close photography area according to the focal length f and to confirm it while photographing is performed. To avoid this, a zoom lens system is required which has a fixed close photography area. When the shortest object distance is N, in close photography, zooming is performed so that in-focus condition is obtained at a subject distance a where the shortest object distance N is the near side (i.e. front side) of the depth of field A with respect to each focal length f.

The subject distance a is obtained in the following manner: When the front limit of the front depth of field $t_1$ is set as the near side of the depth of field A, it becomes easy to include a subject 1 the user wishes to photograph in the depth of field A in close photography. Therefore, when a distance obtained by subtracting the front depth of field $t_1$ from the object distance D is the shortest object distance N, the shortest object distance N is represented by the following expression (14):

$$N = D - t_1 \quad (14)$$

$$= a + b - t_1$$

By substituting the above-described expressions (1') and (8) in the expression (14), the following expression (C) is obtained:

$$N = a + \frac{af}{a-f} - \frac{\delta F a^2}{f^2 + \delta F a} \quad (C)$$

If $\delta$, F and N are fixed in the expression (C), the subject distance a depends on the focal length f, so that the depth of field A which is set as the photography possible distance range can be shifted backward and forward according to the focal length f. Therefore, by performing zooming with the first lens component being moved out so that the subject 1 located at a subject distance a obtained by the expression (C) is imaged on the image plane 3, an excess photography possible distance is removed, so that the photography possible range is from a fixed shortest object distance N set at need to the depth of field A.

Fixed Magnification Photography

For example, when a person is photographed, it is typical that the full length or the bust is shot. Therefore, it is assumed that the photographer performs zooming so that the size of the subject 1 is fixed. That is, it is assumed that the zooming by the photographer is performed by varying the focal length f so that a magnification $\beta$ is fixed. Therefore, in a zoom lens system for a specific purpose such as photographing of the full length or the bust of a person, excellent focus condition can be obtained only by an operation for zooming. When the magnification is $\beta$, in fixed magnification photography, zooming is performed so that an in-focus condition is obtained at a subject distance a where the magnification $\beta$ is fixed with respect to each focal length f.

The subject distance a is obtained in the following manner: The magnification $\beta$ is represented by the following expression (15):

$$\beta = -\frac{b}{a} \quad (15)$$

When a and b are represented by f and $\beta$ by uniting the expression (15) and the image formation formula (1), the following expressions (D) and (E) are obtained. From the expression (11), the following expression (D') is obtained.

$$a = -\left(\frac{1}{\beta} - 1\right)f \quad (D)$$

$$b = (1-\beta)f \quad (E)$$

$$D = a + b \quad (D')$$

$$= f\left(2 - \beta - \frac{1}{\beta}\right)$$

If $\beta$ is fixed in the expression (D), the subject distance a depends on the focal length f, so that the depth of field A which is set as the photography possible range can be shifted backward and forward according to the focal length f. Therefore, by performing zooming with the first lens component being moved out so that the subject 1 located at a subject distance a represented by the expression (D) (or by an object distance D represented by the expression (D')) is imaged on the image plane 3, the best photographs can be obtained at a set fixed magnification $\beta$.

While zooming may be performed along a zoom curve such that the lens component is moved out so that an in-focus condition is obtained at a subject distance a represented by any of the expressions (A) to (D) with respect to the entire range of the focal length f (i.e. for a single purpose), zooming may be performed along zoom curves suitable for different purposes according to the focal length f by providing the used subject distance a with a plurality of tendencies according to the focal length f (i.e. for a plurality of purposes). Specifically, a zoom curve may be used such that the first lens component is moved out so that the best image of the subject 1 is formed within the focal length range by changing the subject distance a depending on the purpose as described above for every specific focal length range. For example, on the wide side, in-focus condition is obtained with respect to the excess focal length, and on the telephoto side, focusing is performed so that close photography is possible. In that case, the zoom curve is a combination such that an in-focus condition is obtained with a combination of a plurality of subject distances a represented by the expressions (A) to (D) and other subject distances.

Further, the zoom curve $L_1$' (FIG. 1) set so that D=∞ may be incorporated in a part of the zoom curve. For example, in a zoom lens system for a purpose of photographing scenery, the best image can be obtained by incorporating the zoom curve $L_1$' in the wide side of the zoom curve.

By using various zoom curves so that various subject distances a can be dealt with, an image of excellent focus condition can be obtained with respect to a wide range without any complicated focusing mechanism.

While zooming may be performed along one zoom curve such that the lens component is moved out so that an in-focus condition is obtained at subject distances a represented by the expressions (A) to (D), the zoom curve may be changed over among a plurality of zoom curves so that zooming is performed along a zoom curve changed by an operation by the user. That is, zooming may be performed according to the purpose by a change-over operation similar to that of the zone focus method.

Further, the zoom curve may be changed over between the above-mentioned zoom curve $L_1$' (FIG. 1) set so that D=∞ and the zoom curve $L_1$ corresponding to the subject distances a represented by the expressions (A) to (D). With this arrangement, in-focus condition can be obtained with respect to a wide range without any complicated focusing mechanism.

By providing the arrangement where the zoom curve can be changed over among a plurality of zoom curves so that various subject distances a can be dealt with as described above, an image of excellent in-focus condition can be obtained with respect to a wide range without any complicated focusing mechanism.

The arrangement where in-focus condition is obtained at subject distances a suitable for purposes as represented by the expressions (B) to (D) may be employed not only in a zoom lens system but also in a uni focal optical system (e.g. lens-fitted photographic film package) and a bi focal optical system which have conventionally been known. In this case, photographing suitable for the above-mentioned specific purposes can be performed in excellent focus condition.

As described above, according to the zoom lens system of the present invention, the lens component is moved out for zooming so that an in-focus condition is obtained at a predetermined subject distance with respect to each focal length, so that no focusing operation is necessary. Thus, the zoom lens system of the present invention is excellent in operability since the operation for focusing is unnecessary and can be realized at a low cost since the mechanism for focusing is unnecessary.

The zoom lens system of the present invention is suitable for normal photography when the subject distance is the excess focal length in moving out the lens component, suitable for flash photography when the far side of the depth of field is the maximum flash reachable distance, suitable for close photography when the near side of the depth of field is the shortest object distance, and suitable for fixed magnification photography when the subject distance is a distance where the magnification is fixed. Thus, since the zoom curve corresponds to the subject distance suitable for the purpose, photographing suitable for the purpose can be performed in excellent focus condition only by performing a zooming operation.

Obviously, many modifications and variations of the present invention are possible in light of the above teachings. It is therefore to be understood that within the scope of the appended claims, the invention may be practiced other than as specifically described.

What is claimed is:

1. A zoom lens system comprising a plurality of lens components, wherein zooming is performed by moving a predetermined lens component according to a zoom curve, said zoom curve being set so that in-focus condition is obtained at a predetermined subject distance according to a focal length, wherein said subject distance is determined according to the following expression:

$$a = \frac{f^2}{\delta F}$$

where a is the subject distance, f is a focal length, δ is a diameter of a permissible circle of confusion, and F is an F number.

2. A zoom lens system as claimed in claim 1, wherein said zoom curve is set so that a subject located at an excess focal length is formed into an image on a predetermined image formed plane with respect to each focal length.

3. A zoom lens system as claimed in claim 1, wherein said zoom curve is set so that in-focus condition is obtained at a subject distance where a far side of a depth of field is a maximum flash reachable distance with respect to each focal length.

4. A zoom lens system as claimed in claim 1, wherein said zoom curve is set so that in-focus condition is obtained at a subject distance where a near side of a depth of field is a shortest object distance with respect to each focal length.

5. A zoom lens system as claimed in claim 1, wherein said zoom curve is set so that in-focus condition is obtained at a subject distance where a magnification is constant with respect to each focal length.

6. A lens system comprising a plurality of focal lengths, wherein all or a part of the lens system is moved with a variation in focal length so that in-focus condition is obtained at a subject distance predetermined according to focal length, wherein said subject distance is determined according to the expression (D):

$$a = -\left(\frac{1}{\beta} - 1\right)f$$

where a is the subject distance, β is a magnification and f is a focal length.

7. A zoom lens system comprising a plurality of lens components, wherein zooming is performed by moving a predetermined lens component according to a zoom curve, said zoom curve being set so that an in-focus condition is obtained at a predetermined subject distance according to a focal length, wherein said subject distance is determined according to the following expression:

$$\frac{G}{F} = a + \frac{af}{a-f} - \frac{\delta F a^2}{f^2 - \delta F a}$$

where G is a guide number of a flash, F is an F number, a is the subject distance, f is a focal length, and δ is a diameter of a permissible circle of confusion.

8. A zoom lens system comprising a plurality of lens components, wherein zooming is performed by moving a predetermined lens component according to a zoom curve, said zoom curve being set so that in-focus condition is obtained at a predetermined subject distance according to a focal length, wherein said subject distance is determined according to the following expression:

$$N = a + \frac{af}{a-f} - \frac{\delta F a^2}{f^2 + \delta F a}$$

where N is a shortest object distance, a is the subject distance, f is a focal length, δ is a diameter of a permissible circle of confusion, and F is an F number.

9. A lens system comprising a plurality of focal lengths, wherein all or part of the lens system is moved with a variation in focal length so that in-focus condition is obtained at a subject distance predetermined according to a focal length, wherein said subject distance is determined according to the following expression:

$$\frac{G}{F} = a + \frac{af}{a-f} - \frac{\delta F a^2}{f^2 - \delta F a}$$

where G is a guide number of a flash, F is an F number, a is the subject distance, f is a focal length, and δ is a diameter of a permissible circle of confusions.

10. A lens system comprising a plurality of focal lengths, wherein all or a part of the lens system is moved with a variation in focal length so that in-focus condition is obtained at a subject distance predetermined according to a focal length, wherein said subject distance is determined according to the following expression:

$$N = a + \frac{af}{a-f} - \frac{\delta F a^2}{f^2 + \delta F a}$$

where N is a shortest object distance, a is the subject distance, f is a focal length, δ is a diameter of a permissible circle of confusion, and F is an F number.

11. A zoom lens system comprising a plurality of lens components, wherein zooming is performed by moving a predetermined lens component according to a zoom curve, said zoom curve being set so that an in-focus condition is obtained at a predetermined subject distance according to a focal length, wherein said subject distance is determined according to the following expression:

$$a = \frac{f^2}{\delta F}$$

where a is the subject distance, f is a focal length, δ is a diameter of a permissible circle of confusion, and F is an F number.

12. A zoom lens system comprising a plurality of lens components, wherein zooming is performed by moving a predetermined lens component according to a zoom curve, said zoom curve being set so that an in-focus condition is obtained at a predetermined subject distance according to a focal length, wherein said subject distance is determined according to the following expression:

$$a = -\left(\frac{1}{\beta} - 1\right)f$$

where a is the subject distance, β is a magnification and f is a focal length.

13. A lens system comprising a plurality of focal lengths, wherein all or a part of the lens system is moved with a variation in focal length so that an in-focus condition is obtained at a subject distance predetermined according to a focal length, wherein said subject distance is determined according to the following expression:

$$a = -\left(\frac{1}{\beta} - 1\right)f$$

where a is the subject distance, β is a magnification and f is a focal length.

14. A zoom lens system comprising a plurality of lens components, wherein zooming is performed by moving a predetermined lens component according to a zoom curve, said zoom curve being set so that in-focus condition is obtained at a predetermined subject distance according to a focal length, wherein said subject distance is determined according to the following expression:

$$a = -\left(\frac{1}{\beta} - 1\right)f$$

where a is the subject distance, δ is a magnification and f is a focal length.

15. A lens system wherein a position of a lens component of the lens system is determined to be one so that in-focus condition is obtained at a subject distance where a far side of a depth of field is a maximum flash reachable distance in a certain focal length condition, wherein said subject distance is determined according to the following expression:

$$a = \frac{f^2}{\delta F}$$

where a is the subject distance, f is a focal length, δ is a diameter of a permissible circle of confusion, and F is an F number.

16. A lens system wherein a position of a lens component of the lens system is determined to be one so that in-focus condition is obtained at a subject distance where a near side of a depth of field is a shortest object distance in a certain focal length condition, wherein said subject distance is determined according to the following expression:

$$a = \frac{f^2}{\delta F}$$

where a is the subject distance, f is a focal length, δ is a diameter of a permissible circle of confusion, and F is an F number.

17. A lens system wherein a position of a lens component of the lens system is determined to be one so that in-focus condition is obtained at a subject distance where a far side of a depth of field is a maximum flash reachable distance in a certain focal length condition, wherein said subject distance is determined according to the following expression:

$$a = -\left(\frac{1}{\beta} - 1\right)f$$

where a is the subject distance, β is a magnification and f is a focal length.

18. A lens system wherein a position of a lens component of the lens system is determined to be one so that in-focus condition is obtained at a subject distance where a near side of a depth of field is a shortest object distance in a certain focal length condition, wherein said subject distance us determined according to the following expression:

$$a = -\left(\frac{1}{\beta} - 1\right)f$$

where a is the subject distance, β is a magnification and f is a focal length.

* * * * *